United States Patent [19]
Baden

[11] 3,772,194
[45] Nov. 13, 1973

[54] SILVER CATALYZED OXIDATION OF COMPLEX METAL CYANIDES

[75] Inventor: Harry C. Baden, Webster, N.Y.

[73] Assignee: Eastman Kodak Company, Rochester, N.Y.

[22] Filed: June 21, 1972

[21] Appl. No.: 265,067

[52] U.S. Cl. .................................................. 210/62
[51] Int. Cl. ............................................. C02b 1/36
[58] Field of Search ...................... 210/62; 96/61 R; 423/103, 38

[56] References Cited
UNITED STATES PATENTS
2,981,682 4/1961 Lancy .................................. 210/62
3,615,507 10/1971 Bard et al. ............................. 96/61

OTHER PUBLICATIONS
The Polarography of Silver, Sagmall R. M. of West T. S., Talanta 9, 925-9 (1962), Chem. Abs. 58:2140 g.

Primary Examiner—Samih N. Zaharna
Assistant Examiner—Benoit Castel
Attorney—William T. French et al.

[57] ABSTRACT

A method of conditioning waste containing complex cyanide compounds and oxidizing at least the complex iron cyanides, e.g. hexacyanoferrates, comprising chlorinating the waste in the presence of a silver ion catalyst (present as a soluble silver salt such as $AgNO_3$, $AgCl_2$, etc.) to convert the cyanide to a non-toxic compound is described. Chlorination is preferably carried out at a temperature of between about 25° and 68° C in an alkaline medium, using an excess of free chlorine or hypochlorite as the chlorinating agent.

13 Claims, 2 Drawing Figures

SILVER CATALYZED OXIDATION OF COMPLEX METAL CYANIDES

FIELD OF THE INVENTION

The present invention relates to the conditioning of waste containing cyanide compounds to reduce their potential toxicity and more particularly to an improved technique for destroying complex iron cyanides commonly present in waste photographic processing solutions by oxidation with chlorine.

BACKGROUND OF THE INVENTION

The hexacyanoferrates, which are contained in relatively high concentrations in most of the bleaches used in photographic processes can be very slowly decomposed to toxic free cyanide ion upon their release into streams or lakes. Several methods have been found to destroy free cyanide, including chlorination, ozonation, electrolytic oxidation, peroxide oxidation, and γ-radiation. The destruction of the complex iron cyanides is more difficult however, and several techniques which, for the reasons explained below, are practically infeasible have been suggested.

Two such suggested processes are those described in U.S. Pat. Nos. 3,101,320 issued Aug. 20, 1963 and 2,981,682 issued Apr. 25, 1961. The former patent describes a technique for treating waste containing iron cyanides which comprises chlorinating the waste with an excess of free chlorine while maintaining a temperature of at least about 160°F (71°C) until chlorination is completed. The latter patent suggests a similar conditioning treatment, however, it requires that the presence of a mercury chloride catalyst.

In the former case a serious problem is encountered with maintaining the required amount of free chlorine in the conditioning solution at the temperature required to achieve complete chlorination.

The technique described in the latter patent provides a useful technique for conditioning iron cyanide solutions, however, as will be demonstrated more fully below, the rate at which chlorination proceeds is relatively slow and renders practical use of this technique very difficult.

SUMMARY OF THE INVENTION

It has now been discovered that treatment of waste containing complex iron cyanides in the fashion described in the foregoing two references can be achieved at highly increased rates and somewhat lower temperatures if the HgCl$_2$ catalyst is replaced by a silver ion (Ag$^+$) catalyst, for example, silver nitrate, silver chloride, etc. When this conditioning technique is utilized it is preferred to maintain the treated solution at a temperature of between about 25° and 68°C and to use an alkali metal hypochlorite as the source of chlorine.

DETAILED DESCRIPTION OF THE INVENTION

Figure 1:
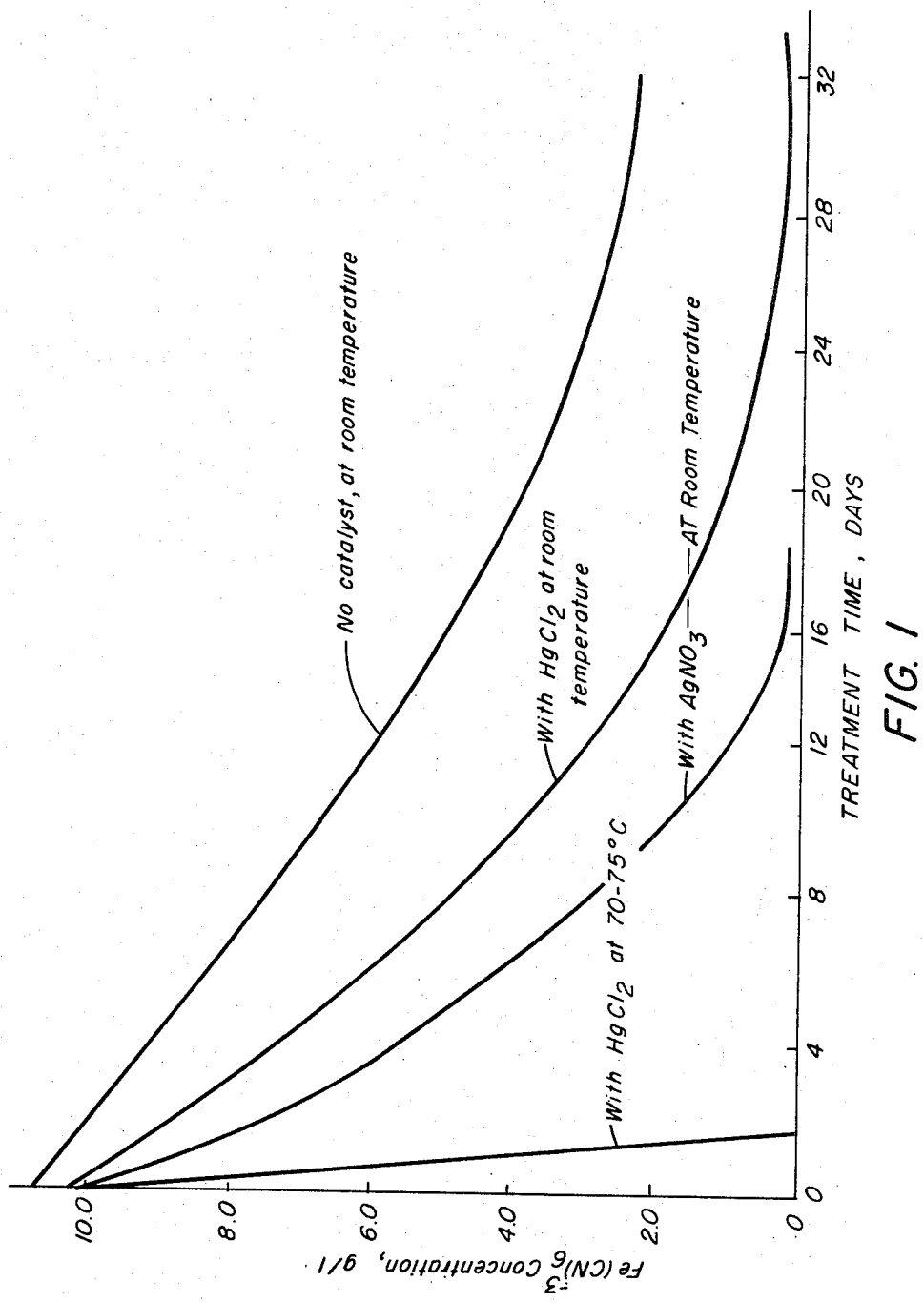
FIGS. 1 and 2 show graphs indicating the rates of destruction of cyanide complexes using various combinations of catalysts and heat.

According to the present invention waste containing complex iron cyanide is conditioned by chlorination in the presence of a silver ion (Ag$^+$) catalyst to oxidize the iron cyanide to a non-toxic compound. According to a preferred embodiment of the present invention the chlorination is performed at a temperature of between about 25° and 68°C with optimum results being obtained at a temperature of between about 61° and 68°C. Treatment at a pH above at least about 7 and preferably above about 10 and use of an alkali metal hypochlorite as the source of chlorine are also preferred.

A variety of reactions have been reported in the literature to be involved in the chlorination of free and complex cyanides. The following is a list of such suggested reactions.

1. $Cl_2 + NaOH \rightarrow NaOCl + HCl$

Destruction of free cyanide:

2. $CN^- + OCl^- \rightarrow OCN^- + Cl^-$

Destruction of cyanate:

3. $OCN^- + 2H^+ + H_2O \rightarrow CO_2 + NH_4^+$
4. $OCN^- + NH_4^+ \rightarrow NH_2CONH_2$
5. $NH_2CONH_2 + 3OCl^- \rightarrow N_2\uparrow + CO_2\uparrow + 3Cl^- + 2H_2O$
6. $2OCN^- + 2H^+ + 3OCl^- \rightarrow CO_2\uparrow + N_2\uparrow + 3Cl^- + H_2O$
7. $2CNO^- + H_2O + 3OCl^- \rightarrow 2CO_2 + N_2\uparrow + 2OH^- + 3Cl^-$ Destruction of Ferrocyanide:

8. $2Fe(CN)_6^{-4} + 13H_2O + 13OCl^- \rightarrow 2Fe(OH)_3 + 13Cl^- + 8OH^- + 12HOCN$ The destruction of the complex cyanides of equation 8 is difficult and the reaction goes very slowly, particularly at room temperature. The aforementioned patents describe techniques for significantly increasing these rates using a mercury catalyst or heating to a temperature of between about 160°–200°F and their shortcomings have been described immediately hereinabove.

A waste solution containing hexacyanoferrate may be a relatively complex solution which is the photographic area may typically contain in addition to the complex cyanides, materials such as alkali metal sulfites, alkali metal carbonates, gelatin hardening agents, acids, halides, gelatin, etc. In some instances, a ferricyanide bleach, for example, may contain developer and/or developer oxidation products which are present as a result of carry-in from the different developer solutions. Even more complicated waste solutions containing cyanides may be formed when different effluents from the photographic processing system are combined together before disposal, e.g. combined bleach and fix and/or prehardener, stabilizer baths, etc. and it is intended by use of the term "waste" to include all such compositions as well as solutions of cyanide arising from sources other than as photographic processing waste.

According to the present invention, chlorination of waste containing cyanides and in particular iron cyanides can be carried out using batch, semicontinuous or continuous techniques. One useful procedure is to bubble chlorine gas into a solution of the waste while adding sodium hydroxide or some other suitable base to the solution to maintain the desired alkaline pH. The amount of chlorine required to condition, i.e. destroy the potentially toxic cyanide compounds, will depend upon the concentration of these present in the solution, the efficiency of the contacting procedure utilized, the extent to which residual cyanide in the treated solution can be tolerated, and so forth. Thus, the amount of chlorine added can vary widely, but it is generally preferred to add an excess of chlorinating agent to insure total destruction of the cyanide compounds. Generally, as described in U.S. Pat. No. 3,101,320 maintenance of an excess of at least about 0.5 grams of free chlorine per liter of solution is desirable.

Although bubbling of chlorine gas through the solution can be an extremely efficient method for achieving chlorination, it is generally preferred that the chlorinating agent be added in the form of an alkali metal hypochlorite, for example, sodium, or potassium hypochlorite. The results achieved by using this system of introduction are essentially the same since as described in formula 1 above, addition of chlorine gas into an alkaline solution results in the formation of hypochlorite. Significant advantage is achieved from a hazard standpoint in using hypochlorite since addition of hypochlorite does not require the handling of highly toxic and corrosive chlorine gas.

Whether chlorination is accomplished by the use of chlorine gas or by the use of hypochlorite, it is preferably carried out in accordance with this invention under alkaline conditions. The required alkaline pH is most easily provided by the addition of a strong base to the solution, e.g. sodium hydroxide or potassium hydroxide, but any other suitable means of maintaining an alkaline pH known to the art may be employed. The strong base is preferably added simultaneously with the addition of the chlorinating agent (chlorine, hypochlorite, etc.). While the method is operable at any alkaline pH, it proceeds most rapidly and efficiently at a high pH. It is, thus, desirable to carry out the chlorination with the solution at a pH of greater than 10 and even more desirably at a pH of 11.5 or more. Chlorination may also be carried out at slightly acid pH, however, the efficiency of the reaction is reduced substantially.

Although the cyanide waste conditioning treatment described herein can be carried out in solution over a wide range of temperatures it is generally preferred that treatment be performed at a temperature of between about 25° and 68°C. Below about 25°C the required reactions proceed, but at such a slow rate that a commercial process of this type is practically infeasible. As alluded to briefly above, at temperatures above about 68°C it becomes increasingly difficult to retain chlorine in the treatment bath, since above this temperature the chlorine is boiled off at a rapid rate. This problem can of course be obviated by the use of pressurized vessels, etc., however, these are expensive, often dangerous and generally not highly desirable. It is thus preferred to perform treatment within the temperature range of between about 25° and 68°C. Most rapid conditioning is of course achieved at the upper end of this range, i.e. at a temperature of between about 60° and 68°C. The desirability of this range will be made clearer when the data derived from the following examples are considered.

Catalytic concentrations of silver ion ($Ag^+$) are required to achieve conditioning. This concentration will range from a minimum of about 0.1 g/l up to about 10 g/l of a suitable silver salt e.g. silver nitrate, silver chloride, etc. in the preferred embodiments, although concentrations outside of this range may also be used. At catalyst levels below about 0.1 g/l chlorination will be extremely slow while the use of silver ion concentrations above about 10 g/l of silver salt are quite costly and therefore, although extremely effective, very expensive.

As alluded to above, the silver ion ($Ag^+$) catalyst can be provided to the solution in the form of almost any conventional soluble silver salt which acts as a source of the desired ion. Data to date indicate that silver nitrate is a highly useful source of the catalytic ion.

The following example when considered in conjunction with the accompanying drawings will serve to better illustrate the advantages of the present invention.

EXAMPLE I

Six solutions were made up each consisting of 500 ml of a conventional ferricyanide bleach having the following composition:
Water 800 ml
Potassium Ferricyanide 165.0 grams
Sodium Bromide 43.0 grams
and 500 ml of a 5 percent sodium hypochlorite solution. The pH was maintained above 10 by addition of sodium hydroxide and more hypochlorite solution was added when needed to maintain the required excess. The six solutions were evaluated as follows:
A. Room temperature (25°C) with no catalyst
B. Room temperature (25°C) 0.5 g/l of $HgCl_2$ and constant stirring
C. Room temperature (25°C) 0.5 g/l of $AgNO_3$ and constant stirring
D. 70°–75°C with 0.5 g/l $HgCl_2$ and constant stirring
E. 80°–85°C with 0.5 g/l $HgCl_2$ and constant stirring
F. 62°–68°C with 0.5 g/l $AgNO_3$ and constant stirring
G. 82°–88°C with no catalyst Samples from each experiment were taken periodically; the reaction was stopped with $Na_2SO_3$, and the samples were analyzed for $Fe(CN)_6^{-3}$ content by development of a soluble Prussian blue and subsequent color meter measurement to determine total residual cyanide concentration.

Figure 2:
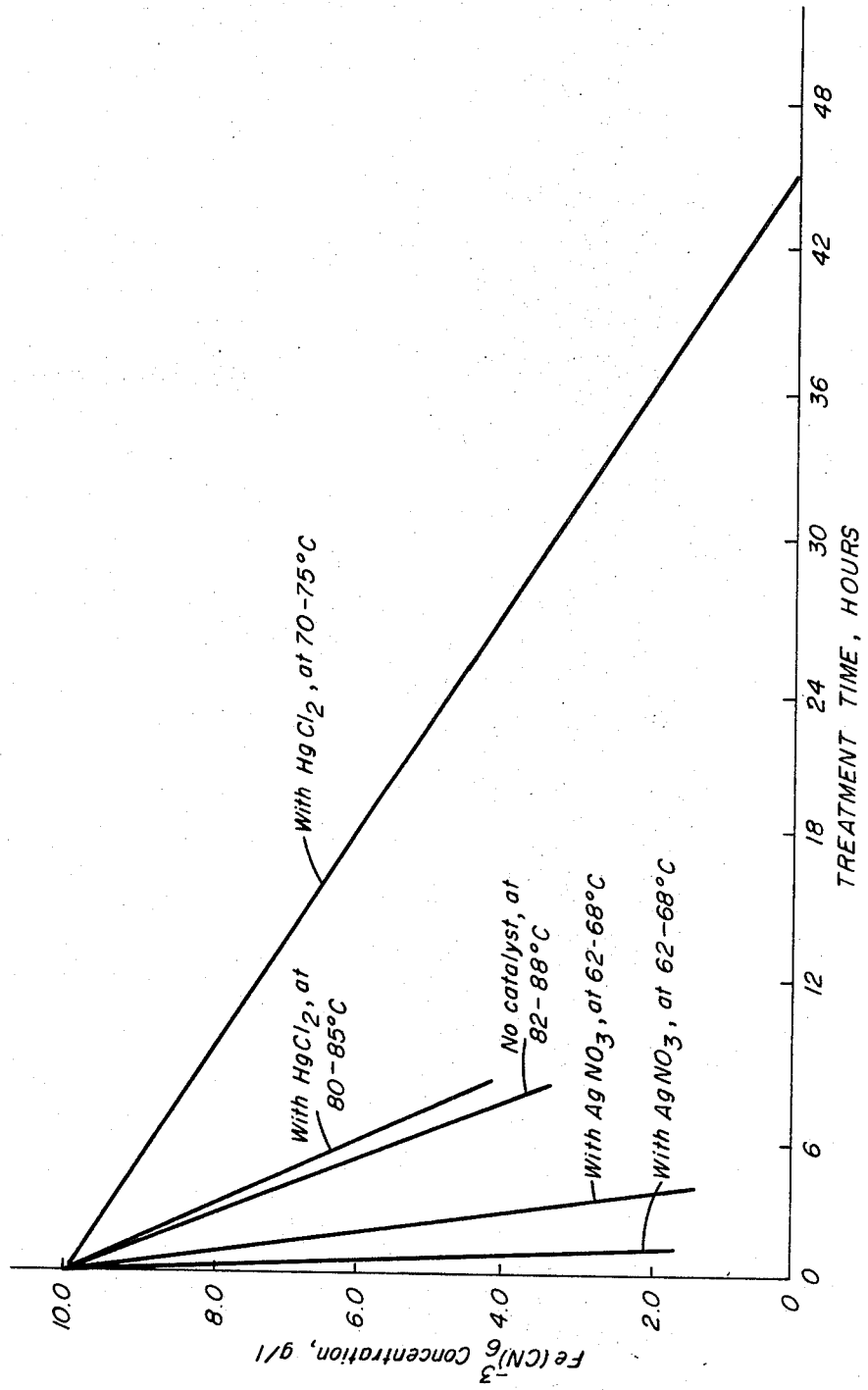

The results of these evaluations are shown in FIGS. 1 and 2. As shown in the drawing, destruction of ferricyanide at room temperature in the absence of any catalyst is very slow. The addition of $HgCl_2$ at room temperature only doubles the rate. In each case the pH decreased slowly resulting in the precipitation of Fe(OH)$_3$, which was occasionally filtered off.

The experiments performed at elevated temperatures (FIG. 2) show that the complex could be completely destroyed in less than two days at temperatures of 70°–75°C using a $HgCl_2$ catalyst. At this temperature and temperatures above this level it became increasingly difficult to maintain an excess of hypochlorite since the chlorine was vaporized. Attempts to provide a continuous feed device failed and hence results of tests performed at a temperature above 80°C are shown only for the initial 8 hours during which an excess of hypochlorite was present.

From these data it can be concluded that the use of $HgCl_2$ as a catalyst provides a significantly faster reaction, but at room temperature complete destruction still requires more than four weeks.

When the solution is heated the rate of reaction is significantly increased as might be expected. With $HgCl_2$ as the catalyst and the temperature at 70°–75°C the ferricyanide was destroyed in less than two days. At higher temperatures, with or without the $HgCl_2$ catalyst, the reaction is faster, however, the aforementioned problems of maintaining an excess of hypochlorite significantly reduce the value of any speed increase. Chlorination at 60°–65°C with $Ag^+$ as the catalyst permits destruction of the cyanide in less than 6 hours (about one-eighth the time required with the $HgCl_2$ catalyst) while maintenance of chlorine excesses is not a problem. Thus, the technique described herein offers significant advantages from the point of view of the amount of time required to achieve complete cyanide destruction and also ease of achieving total waste conditioning.

The invention has been described in detail with particular reference to preferred embodiments thereof; however, it will be understood that variations and modifications can be effected within the spirit and scope of the invention.

I claim:

1. In a process of chlorination of a solution containing hexacyanoferrate ions to convert said ions to less toxic agents, the improvement which comprises performing the chlorination in the presence of a catalytic amount of silver ion.

2. The process of claim 1 wherein said chlorination is carried out at an alkaline pH.

3. The process of claim 1 wherein said chlorination is carried out at a pH of greater than 10.

4. The process of claim 1 wherein said chlorination is carried out at a pH of at least 11.5.

5. The process of claim 1 wherein said chlorination is carried out at a temperature of about 25°C to about 68°C.

6. The process of claim 1 wherein said chlorination is carried out at a temperature of 61°C to 68°C.

7. The process of claim 1 wherein said chlorination is carried out while maintaining an excess of chlorine of at least about 0.5 grams of free chlorine per liter of solution.

8. The process of claim 1 wherein said chlorination is carried out by bubbling chlorine gas through said solution.

9. The process of claim 1 wherein said chlorination is carried out by using an alkali metal hypochlorite as the chlorinating agent.

10. The process of claim 1 wherein said chlorination is carried out by using sodium hypochlorite as the chlorinating agent.

11. The process of claim 1 wherein said chlorination is carried out with from about 0.1 to about 10 grams per liter of solution of a silver salt as catalyst.

12. The process of claim 1 wherein said chlorination is carried out with the use of silver nitrate as catalyst.

13. The process of claim 1 wherein said solution is a waste photographic ferricyanide bleach solution.

* * * * *